(12) United States Patent
Letailleur et al.

(10) Patent No.: US 6,254,420 B1
(45) Date of Patent: Jul. 3, 2001

(54) DEVICE FOR EFFECTING INSULATION-DISPLACING CONNECTION OF ONE OR MORE WIRES AND FOR CUTTING THE SCRAP AT THEIR FREE END

(75) Inventors: Jean-Pierre Letailleur; Pierre Bonvallat, both of Cluses (FR)

(73) Assignee: Pouyet, S.A. (FR)

( * ) Notice: Subject to any disclaimer, the term of this patent is extended or adjusted under 35 U.S.C. 154(b) by 0 days.

(21) Appl. No.: 09/291,399

(22) Filed: Apr. 14, 1999

(30) Foreign Application Priority Data

Apr. 14, 1998 (FR) .................................................. 98 04885

(51) Int. Cl.⁷ .............................. H01R 4/24; H01R 4/26; H01R 11/20
(52) U.S. Cl. ........................................... 439/392; 439/413
(58) Field of Search ..................... 439/413, 412; 77/392

(56) References Cited

U.S. PATENT DOCUMENTS

| | | | |
|---|---|---|---|
| 4,370,009 | * 1/1983 | Dola | 439/177 |
| 4,444,447 | * 4/1984 | Markwardt | 439/392 |
| 5,139,440 | * 8/1992 | Volk et al. | 439/413 |

* cited by examiner

*Primary Examiner*—Neil Abrams
*Assistant Examiner*—Michael C. Zarroli
(74) *Attorney, Agent, or Firm*—Richard P. Gilly

(57) ABSTRACT

A connection device is particularly suited for connection of the two strands of a telephone or computer-related line in a sub-distribution terminal block. The device includes an insulating base with a cavity formed therein in which I.D.C. contacts are secured for receiving the strands. Opposite each I.D.C. contact is secured a blade for cutting the scrap of wire. A pusher, comprising a master screw for movement and lateral slots for introduction of the wires, is telescopically associated with this base. The cutting blade is provided so that, after the cut, the free end of the cut wire is disengaged from this blade. The assembly further forms a reservoir of sealing gel, or other like product, which is virtually closed.

12 Claims, 7 Drawing Sheets

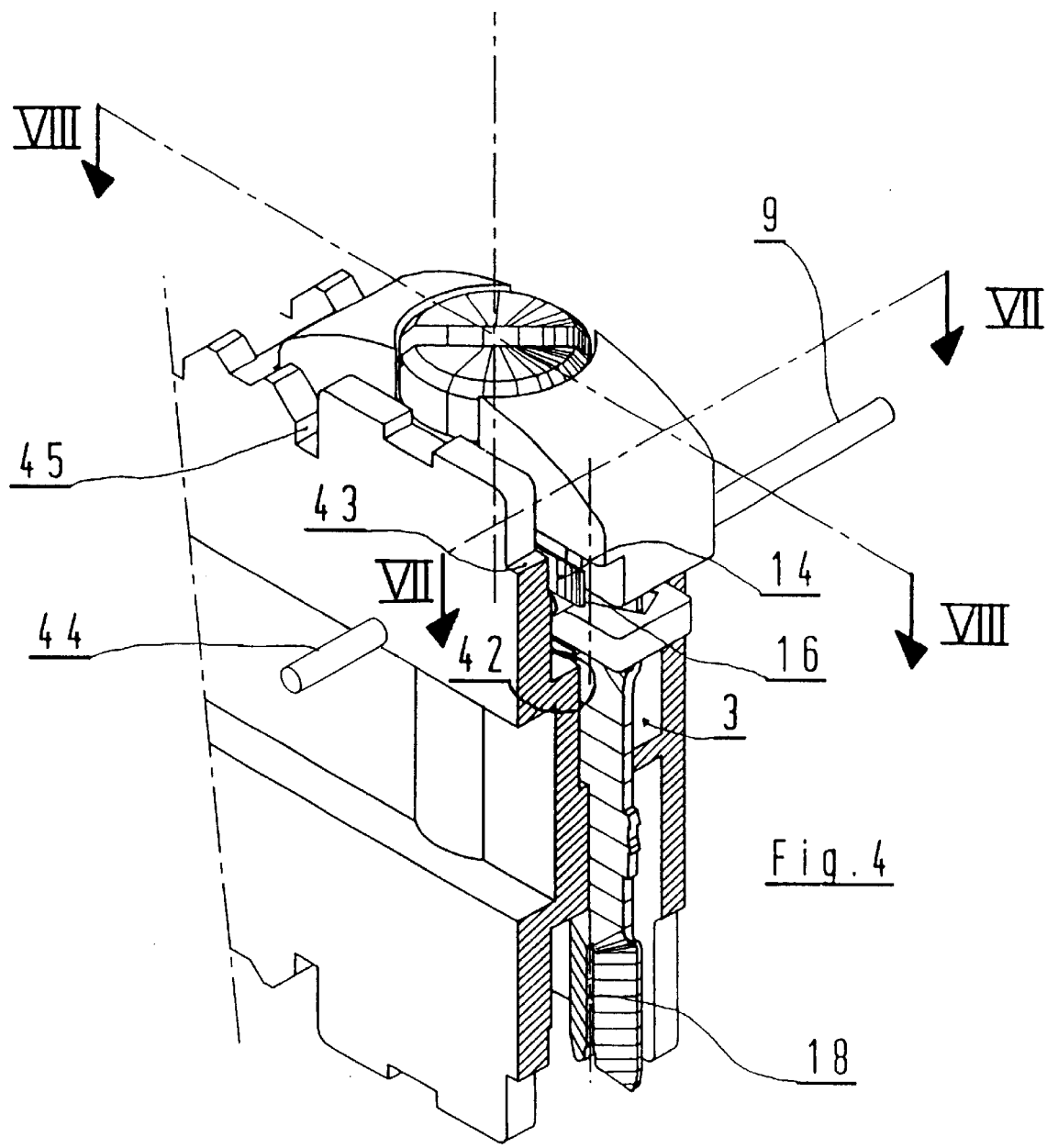

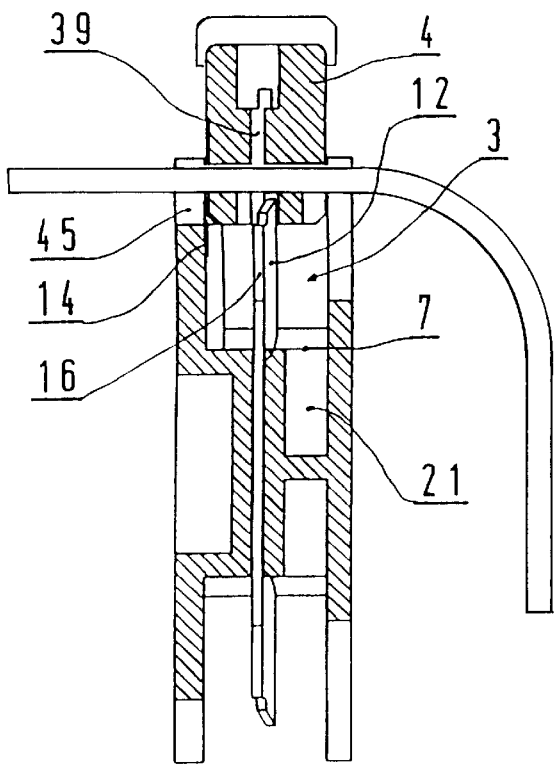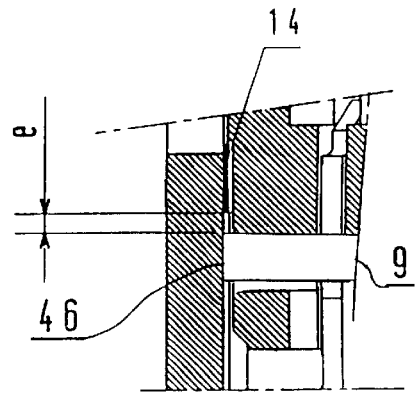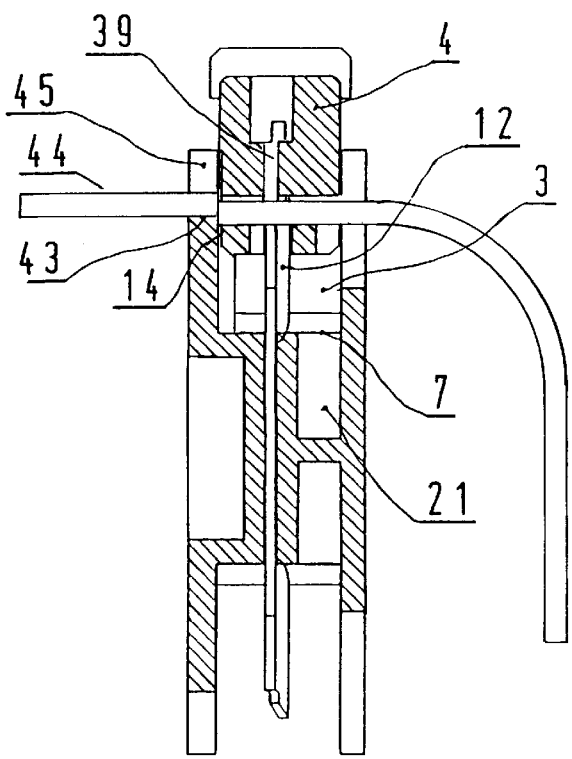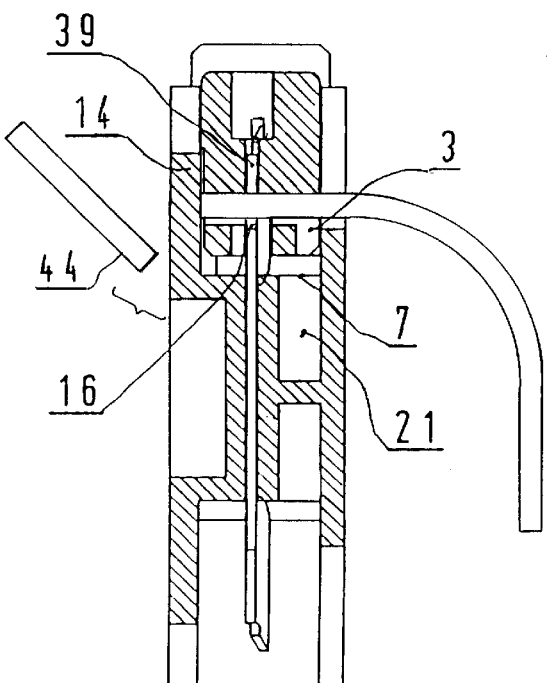

DEVICE FOR EFFECTING INSULATION-DISPLACING CONNECTION OF ONE OR MORE WIRES AND FOR CUTTING THE SCRAP AT THEIR FREE END

FIELD OF THE INVENTION

The present invention relates to a device for making, in one action, the so-called insulation-displacing connection ("I.D.C.") of one or more electrical or telephone wires, and for cutting the scrap at their free end, downstream of the point of connection.

BACKGROUND OF THE INVENTION

Documents EP-A-0 092 953 and EP-A-0 519 842 disclose connection devices of rotating type which effect, on one wire, the insulation-displacing connection and cut of the useless scrap at the free end of this wire, by a movement of rotation of a barrel integral with the device, which is rotated with the aid of a screwdriver introduced in a slot provided to that end on this barrel.

According to document EP-A-0 092 953, the wire must firstly be introduced in a through orifice forming part of the device, this bringing about considerable difficulties in wiring, in particular when these devices equip terminal blocks for interconnection of lines (typically telephone or computer-related lines) and when these terminal blocks are very close to one another, consequently rendering access to these orifices difficult. Moreover, such introduction in a necessarily small orifice is an operation requiring a certain degree of attention, and which is tiring for the assembler who, after a certain time of work, might begin to make defective connections.

The rotating connector according to document EP-0,519, 842 does not present this drawback and is therefore improved over the preceding one (which, moreover, is older), as the wire to be connected is introduced, via the top of the connector, in a receiving slot of this connector (it is then said to be "combed" in this receiving slot). Accessibility is therefore largely improved, even if the terminal blocks are very close to one another. In addition, as it is necessary to grip the wire at two places (one upstream and the other downstream) in order to be able to "comb" it in its receiving slot, the wire is guaranteed to be totally introduced in this slot, which is not the case when this wire must be introduced with one hand in a through or blind orifice and when it is not always possible to see the end of this wire project on the other side.

On the other hand, although it is largely improved on that point, the connector according to EP-0,519,842 presents a few drawbacks:

It only allows one wire to be wired at a time, while it would be much quicker and more logical to wire the two wires of one pair at the same time, in one and the same operation;

It necessitates, in a terminal block, a connection of relatively large dimensions compared to that desired at the present time where compactness is an absolute requirement;

With the dimensions imposed at the present time for this type of rotating connector, it is impossible for it to wire and cut wires whose core has a cross-section greater than 0.6 millimeters, as the effort to be developed would become too great for the structure of the connector to be able to withstand it without deforming. Now, it is desired at the present time, for telephone installations in particular, to be able to use wires whose diameter may go up to 0.8 millimeters. Unfortunately, it is not possible, for reasons of dimensions, to make terminal blocks with rotating connectors having a diameter greater than that adopted at the present time.

It does not indicate any means, animated by the reverse rotation of the barrel, to unwire (disconnect) the wire previously wired in the rotating connector, then to rewire it (connect again) by the turn of a screwdriver, although this would be very convenient for making test and corrective maintenance operations.

There is not sufficient space nor means to be able to embed, efficiently and rapidly, both the internal part of the connector and the cut end of the wire, in a gel or other like sealing product allowing these metallic elements to be protected against humidity if used outside.

It is necessary to use a screwdriver whose flattened end has a well determined width, adapted to the width of the barrel; if this flat end is too narrow, the force of rotation is insufficient and there is a risk of the connector being damaged, and if, on the contrary, this flat end is too wide, it cannot enter the slot provided on the barrel.

It is complex, therefore expensive, to produce a metallic contact of cylindrical form by cutting out flat, then winding, and this operation furthermore necessitates a quantity of metallic material much larger than that necessary for making a simple flat contact, this further increasing the cost price of the connector.

The very design of this connector means that a considerable torque is created when the wire is connected, especially if it is a wire whose diameter is greater than 0.6 mm, by rotation of the barrel. This torque tends to deform the cylindrical outer part of the connector, which may bring about deterioration of the connection device.

Document GB-2,097,201 may also be mentioned as prior art. It describes a connection device using, for connecting a sheathed wire, an I.D.C. contact, a connection pusher, and a blade for cutting the scrap. With this device, the scrap is cut just at the end of the connection operation via the insulation-displacement slot of the I.D.C. contact, and the free end of the wire then remains in electrical contact with the cutting blade. This is very damaging, particularly in a damp environment where phenomena of electrolysis may be created on the cutting blade in that case dampened and still electrically connected to the corresponding line wire.

It is an object of the present invention to overcome these drawbacks.

SUMMARY OF THE INVENTION

To that end, the invention relates to a device for making, in one action, the insulation-displacing connection, or "I.D.C.", of one or more electrical or telephone wires, and for cutting the scrap at their end, this device comprising:

- an insulating base which forms a cavity in which are implanted the I.D.C. contacts for receiving the electrical wires,
- opposite each I.D.C. contact and parallel thereto, a blade for cutting the scrap,
- a connection pusher which comprises lateral slots for introduction of the wires and which is associated telescopically with said base, characterized in that said cutting blade is dimensioned and positioned so as to be sufficiently after the bottom of the insulation-displacing slot of the I.D.C. contact associated therewith, for the electrical wire to arrive, when it is totally connected, at a distance from this cutting blade.

This device is preferably designed to receive two wires to be connected in the same movement of the pusher, and in that case it comprises a master screw which is placed between the two respective "cutting blade—I.D.C. contact" pairs, each associated with one of the wires to be connected.

In that case, the assembly is preferably symmetrical with respect to the transverse plane which passes through the axis of this screw and which is orthogonal to the two I.D.C. contacts and to the two cutting blades.

Likewise, said base and said pusher are preferably designed to form, when they are enclosed in each other, a virtually closed reservoir for containing a gel or other like sealing product for protection against outside aggressions, such as dust and humidity.

The pusher advantageously forms, beyond the space which receives each I.D.C. contact, a reserve of gel or other like product which overhangs and envelops this I.D.C. contact.

BRIEF DESCRIPTION OF THE DRAWINGS

The invention will be more readily understood on reading the following description of a non-limiting embodiment thereof, with reference to the accompanying drawings, in which:

FIGS. 3 and 4 are views similar to FIG. 2, showing the following two phases of connection of the wire by screwing the master screw.

FIGS. 5, 6 and 7 are vertical sections along V—V of FIG. 2, VI—VI of FIG. 3, and VII—VII of FIG. 4, respectively, showing in the same manner the three phases of connection of one of the two wires of the bifilar line to be connected.

FIG. 7A is an enlarged view of a detail of FIG. 7, showing that the connected free end of the wire arrives below the cutting blade.

DESCRIPTION OF PREFERRED EMBODIMENT

Figure 1:
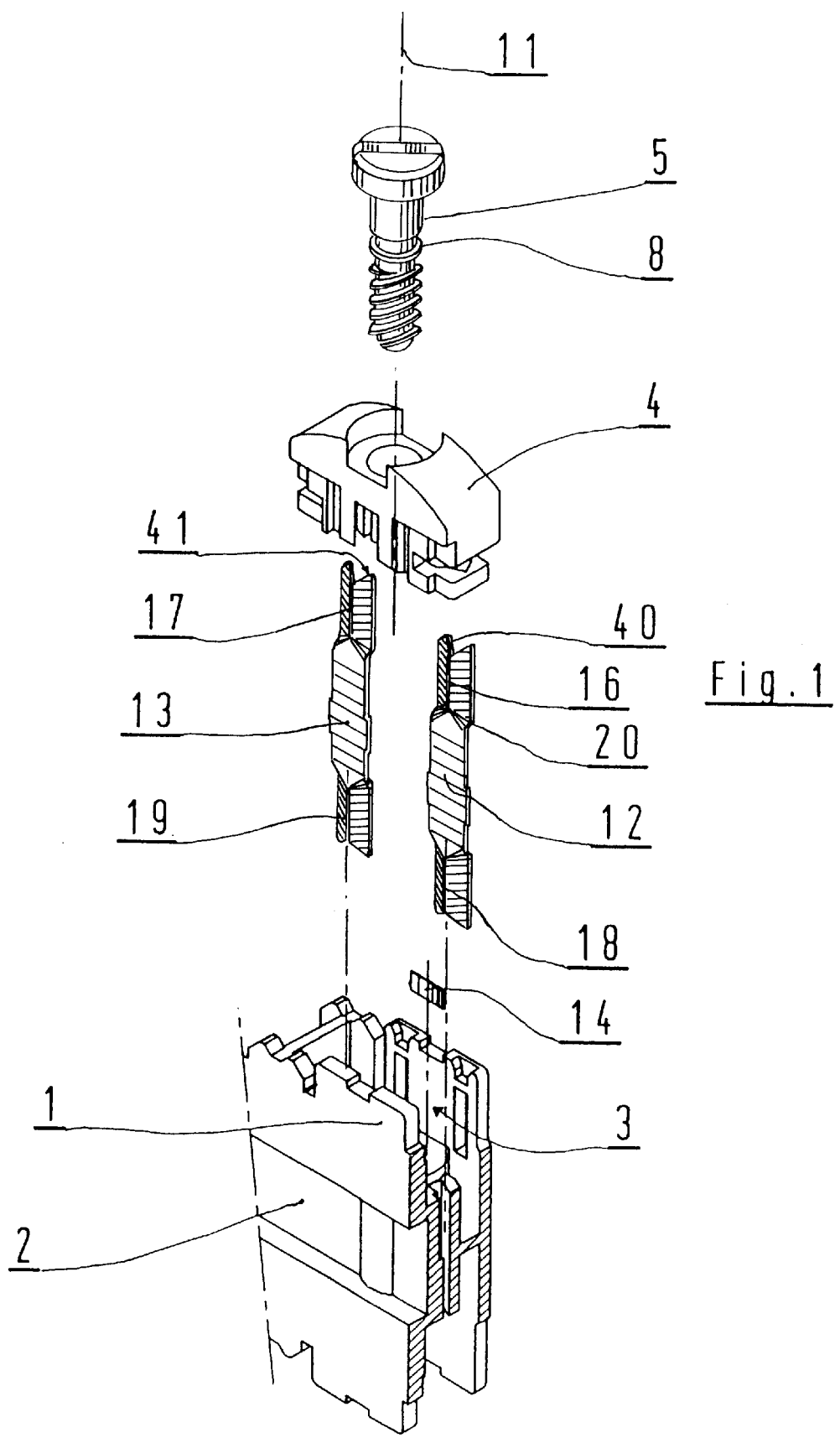
FIG. 1 is an exploded view in perspective, with parts torn away, of this connection device.

Referring now to the drawings, and firstly to FIGS. 1, 2, 8, 9, 11 and 12, this connection device comprises a base 1 typically constituted by a part of the body of a terminal block 2, for example a terminal block for distribution, or more typically for sub-distribution of telephone or computer-related lines, which forms a cavity 3 adapted to receive a connection pusher 4, which penetrates with telescopic smooth friction in this cavity 3 when it is pushed therein by the rotation of a master screw 5 which is screwed in a tapping 6 (FIGS. 8 and 9) provided to that end in the body of the base 2 and starting from the bottom 7 of the cavity 3.

The screw 5 is conventionally rendered captive thanks to a groove 8 for retaining this screw, said groove cooperating with elastic catches 49 of the connection pusher 4.

The base 1 contains, in its cavity 3, two I.D.C. contacts 12 and 13, with their conventional inlet bevels 40, 41 and their conventional insulation-displacing slots 16, 17, these I.D.C. contacts being substantially flat and with axes parallel to axis 11 of the screw 5, as well as two small flat cutting blades 14 and 15. Contact 12 and blade 14, on the one hand, and contact 13 and blade 15, on the other hand, respectively receive the two strands 9 and 10 (FIG. 8) of a bifilar line which is, for example, an incoming line.

The cutting blade 14 is parallel to the contact 12 and opposite its insulation-displacing slot 16, the blade 14 and the contact 12 being spaced apart by a distance of the order of some millimeters (about two millimeters in this embodiment). The I.D.C. contact 12 comprises at its end opposite that of the slot 16, another insulation-displacing slot 18 which is intended to receive the electrical line strand or wire (the outgoing line in the example in question) which is to be connected to the electrical strand or wire 9 of the incoming line. As is clearly seen in FIG. 8, the height H of the blade 14 is less than the length L of the slot 16, and this cutting blade 14 is positioned so as to be sufficiently spaced apart from the bottom 20 of the insulation-displacing slot 16 of the associated I.D.C. contact 12 for, according to FIGS. 8 and 7A, the electrical strand or wire 9 to arrive, when it is totally connected, at a short distance "e" below this cutting blade 14 (assuming here that the wire 9 is introduced from top to bottom as shown in this example).

The same applies to the other contact 13, its insulation-displacing slot 17, the cutting blade 15 associated therewith, and its other insulation-displacing slot 19, all these elements, which concern the other electrical strand or wire 10 of this incoming line being strictly identical to those concerning the electrical strand or wire 9 of this line.

The connector shown is therefore intended to wire the two strands 9 and 10 (FIG. 8) of a bifilar line with the result that it is symmetrical with respect to the median transverse plane which passes through the axis 11 of the screw 5 and which is orthogonal to the two I.D.C. contacts 12 and 13 as well as to the two cutting blades 14 and 15. As shown in the drawings, the master screw 5 is placed at the centre, between the two respective "cutting blade—I.D.C. contact" pairs, each associated with one of the two wires 9 and 10 to be connected, with the result that its action is well balanced between the two symmetrical right/left parts that it moves.

Furthermore, the insulating body of the pusher 4 is shaped to so as present, on either side of the master screw 5 as shown in the drawing, two lateral slots 31 and 32, which are coplanar and located in a plane, here horizontal and therefore orthogonal to the planes of the cutting blades 14, 15 and of the I.D.C. contacts 12, 13, and which are dimensioned, in width and in depth, to receive, respectively, the two strands of line 9 and 10, so that they arrive at the level of the respective insulation-displacing slots 16, 17 of the respective I.D.C. contacts 12 and 13. These two slots 31, 32 are here provided in the lower part of the pusher 4, and, in any case, they arrive above the I.D.C. contacts 12, 13 when the pusher 4 is in upper position in accordance with FIGS. 4, 7, 9 and 11.

Figure 11:
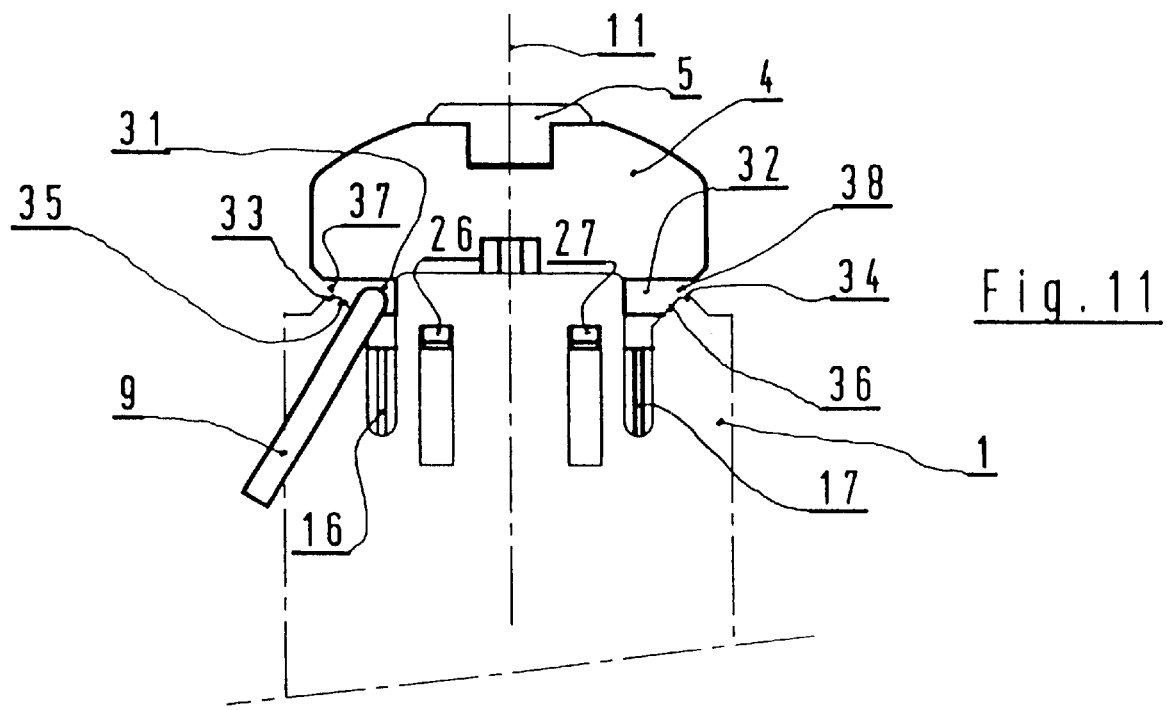
FIG. 11 is a side view showing how the pusher is prevented from leaving, with the screw in extreme unscrewed position.

In addition, as is very clearly shown in FIG. 11, the base 1 presents, on its upper edge which faces the pusher 4, two excrescences or beads 33, 34 which present a slope 35, 36 descending towards the axis 11 of the pusher 4 and which, when this pusher is in upper position or "disengaged to a maximum", form on the one hand, a narrow section 37, 38 for inlet of the strands 9, 10 in their receiving slots 31, 32, which prevents them from leaving once introduced, and, on the other hand, form a bevel for inlet of these telephone wires 9, 10 towards their insulation-displacing slots 16, 17 respectively associated therewith.

Finally, as may be seen in FIGS. 5 to 7, the pusher 4 presents, in the axis of each of the I.D.C. contacts 12, 13, when this pusher is in position overlapping these contacts, two respective vertical slots 39 which are dimensioned to allow free slide of these contacts in the insulating body of the pusher when the latter, under the action of the master screw 5, descends and progressively enters the cavity 3.

It is important to note that this connection device is designed to form, in addition, a reservoir virtually closed on all sides, for a gel or other like sealing product for protection against bad weather and other outside aggressions.

Figure 10:
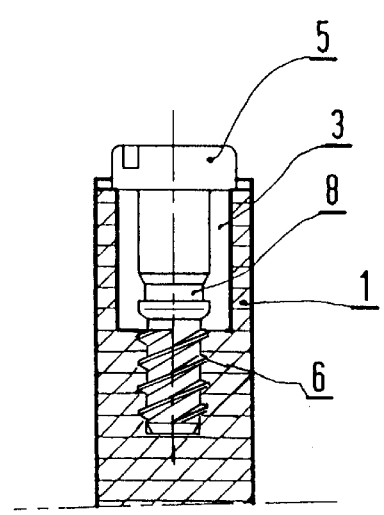

The pusher 4 and the cavity 3 slide in one another and they are shaped to form a closed internal volume which varies depending on the position of the screw 5. This volume is filled with sealing gel or other like product before the first connection operation, the screw 5 in that case typically being in lower position (FIG. 10). Very advantageously, there is provided in the body of the base 1 and in extension of the cavity 3 beyond its bottom 7 (cf. FIG. 5), an additional cavity 21 which serves as reserve of gel or other like product. In addition, as clearly shown in FIG. 8, there are provided in the pusher 4 two respective spaces 22, 23 for receiving sealing gel or other like product, above the two I.D.C. contacts 12, 13, these spaces overhanging and enveloping these I.D.C. contacts: these I.D.C. contacts are thus guaranteed to be embedded in the gel or other like product.

Figure 8:
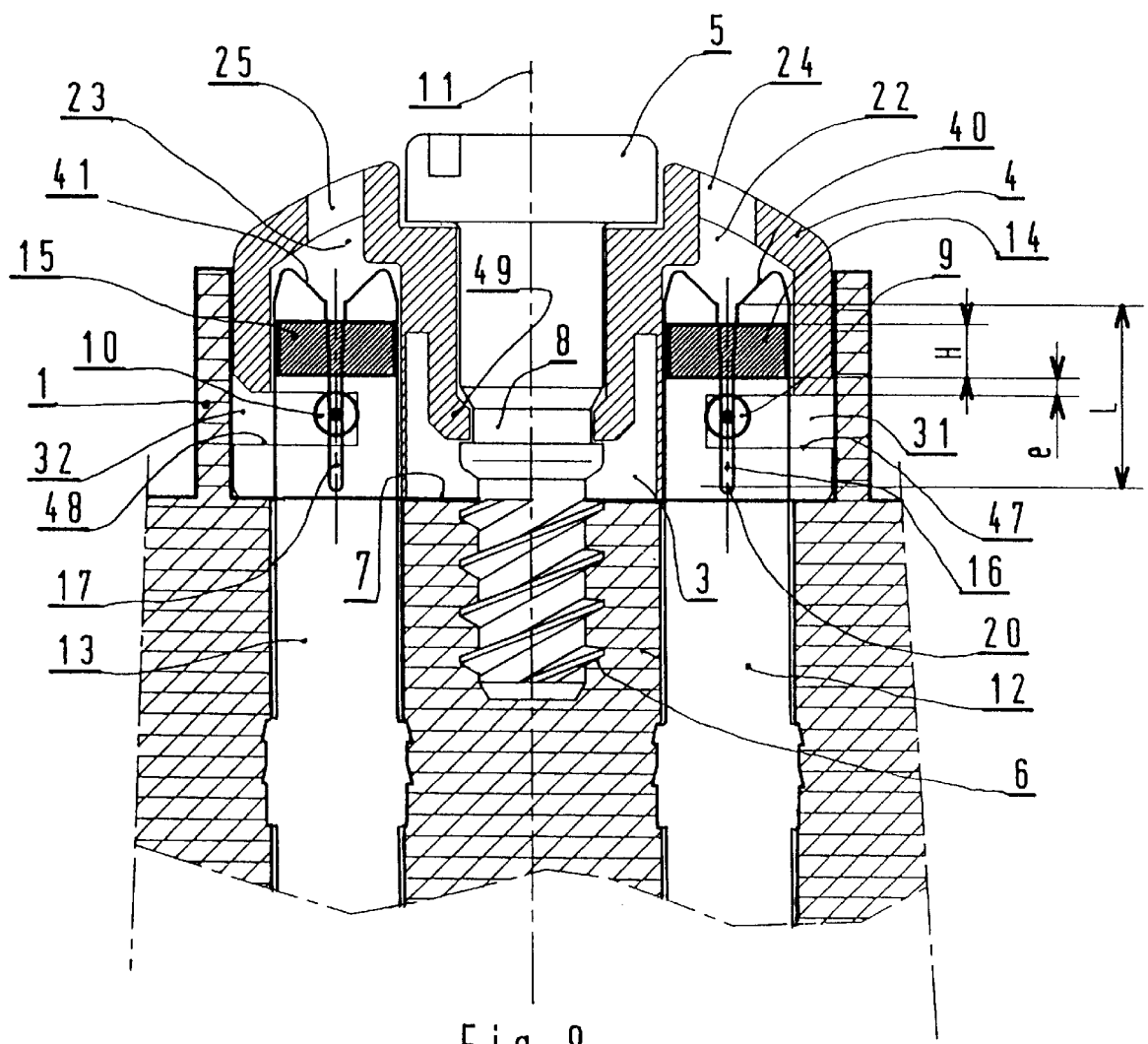
FIG. 8 is a partial vertical section along VIII—VIII of FIG. 4, clearly showing the internal part of the pusher and the position of the two connected line wires.

As indicated in dot-and-dash lines in FIG. 8, it is also possible to provide two test orifices 24 and 25 (allowing access to the respective I.D.C. contacts 12 and 13) in the cover constituted by the pusher 4. These orifices open out in the upper spaces 22 and 23 mentioned above, which are filled with gel or other like product, so that it is sure that each test does not harm the protection of the contacts 12 and 13 by the gel or other like sealing product, the latter continuing to cover these contacts copiously, despite the test operation.

Figure 12:
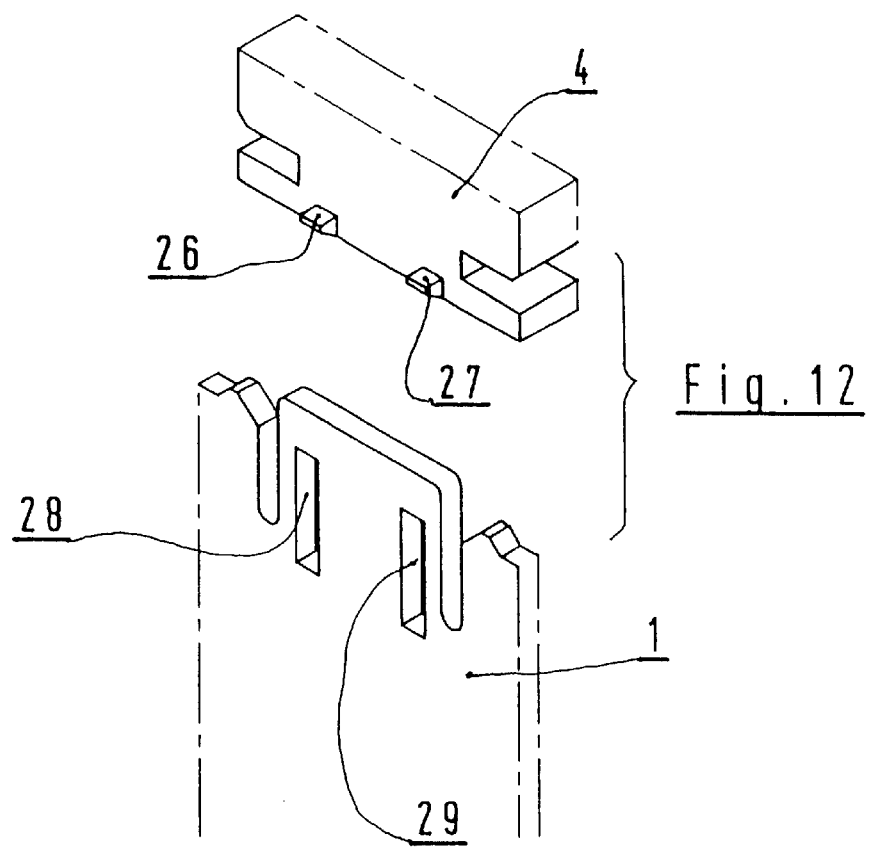
FIG. 12 shows in exploded, partial detail, perspective view the two catches and the two slots which cooperate, according to FIG. 11, to stop the pusher in upper position.

As shown in FIGS. 11 and 12, the pusher 4 is retained in the base 1, when this pusher is at maximum distance from this base due to the screw 5 being unscrewed to the extreme (which corresponds to the upper position in accordance with FIGS. 2, 5 and 9), by the cooperation of two catches 26 and 27 of the pusher and two conjugate vertical slots 28 and 29 for guiding and stopping, which are made in the vertical wall of the base 1. Of course, the number of conjugate catches and slots may be less or greater than two.

Operation of the device will now be explained with reference to all of FIGS. 2 to 10.

Figure 9:
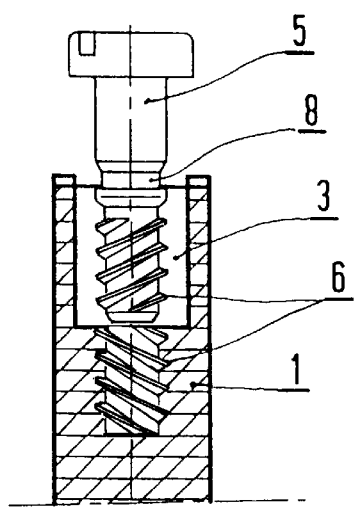
FIGS. 9 and 10 are partial sections showing very schematically the two end positions of the master screw.

At the start, it is supposed that no wire has yet been connected, and the screw 5 is in its lowermost position in accordance with FIG. 10. This screw 5 is then unscrewed until it is total disengaged from the hold of the tapping 6, as shown in FIG. 9, the relative positions of the base 1 and of the pusher 4 in that case being those which correspond to FIGS. 2, 5 and 11.

Figure 2:
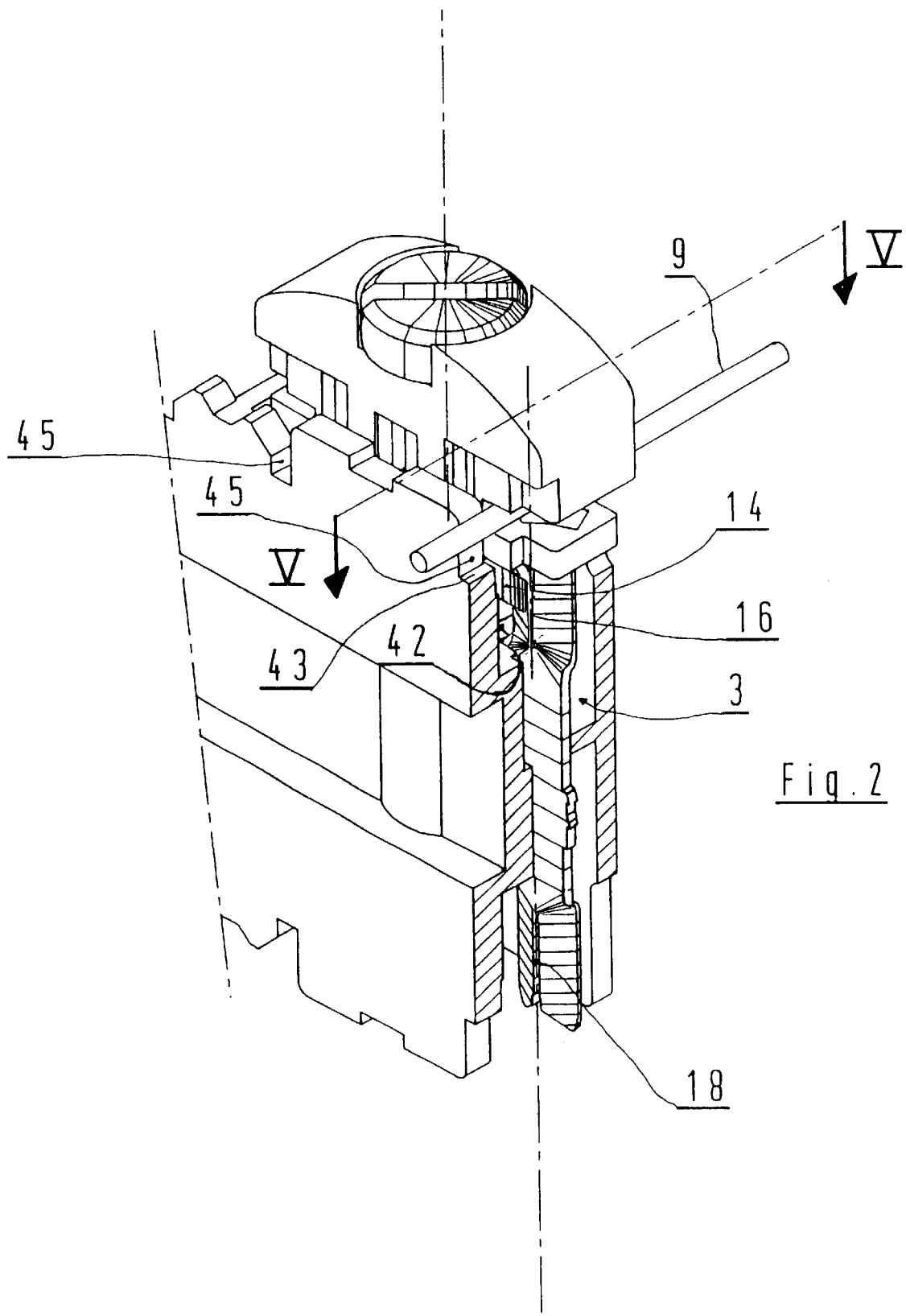
FIG. 2 is a perspective view, with parts torn away, of this same device, one of the two wires of the line to be connected being "combed" in its receiving slot, and the pusher being placed in its upper position in this Figure.

As shown in FIGS. 2, 5 and 11, the line wires 9 and 10 (only wire 9 has been shown here, in order not to overload the drawing) are laterally introduced, or "combed", in their respective receiving slots 31 and 32. The inlet beads 33 and 34 prevent them from leaving these receiving slots laterally, and the bevels 35 and 36 ensure that, when the screw 5 starts to be screwed, they will be correctly directed towards their respective insulation-displacing slots 16 and 17 as well as against the edge of their respective cutting blades 14 and 15. In this starting position, the two strands 9 and 10 are, of course, due to the conformation of the base 1, positioned above their respective cutting blades 14 and 15.

It should be noted that, although it is exact that the introduction of the telephone wires 9 and 10 into the slots 31 and 32 is effected laterally, each wire is in actual fact not combed laterally at the beginning of operation, but upwardly, i.e. "via the top", which is more practical. In effect, as mentioned hereinbefore, the base 1 forms part of a terminal block, typically a distribution or sub-distribution terminal block. In such a terminal block, the pushers 4 which are of rectangular and elongated cross-section, form a mosaic, with the result that the pusher 4 shown is separated from the adjacent pusher only by a space, of the order of one to two millimeters for example, consequently defining a small gap which constitutes a vertical slot, orthogonal to slot 31, in which the wire 9 will be able to be combed by introducing it via the top of the terminal block 2 as far as the bottom of this gap, then by displacing it laterally to make it penetrate in its receiving slot 31, without risk of false manoeuvre.

The screw 5 will then start to be screwed, which begins descent of the pusher 4, and the two strands 9 and 10 which it imprisons, towards the internal part of the cavity 3.

As clearly shown in FIG. 2, the cutting blade 14, which is fixed on the internal wall 42 of the cavity 3, projects very slightly (by a fraction of millimeter to give an idea) beyond the upper edge 43 of the base. At that spot, as shown, this edge is recessed in order to define a vertical slot 45 which allows correct guiding and good hold of the wire 9.

Figure 3:
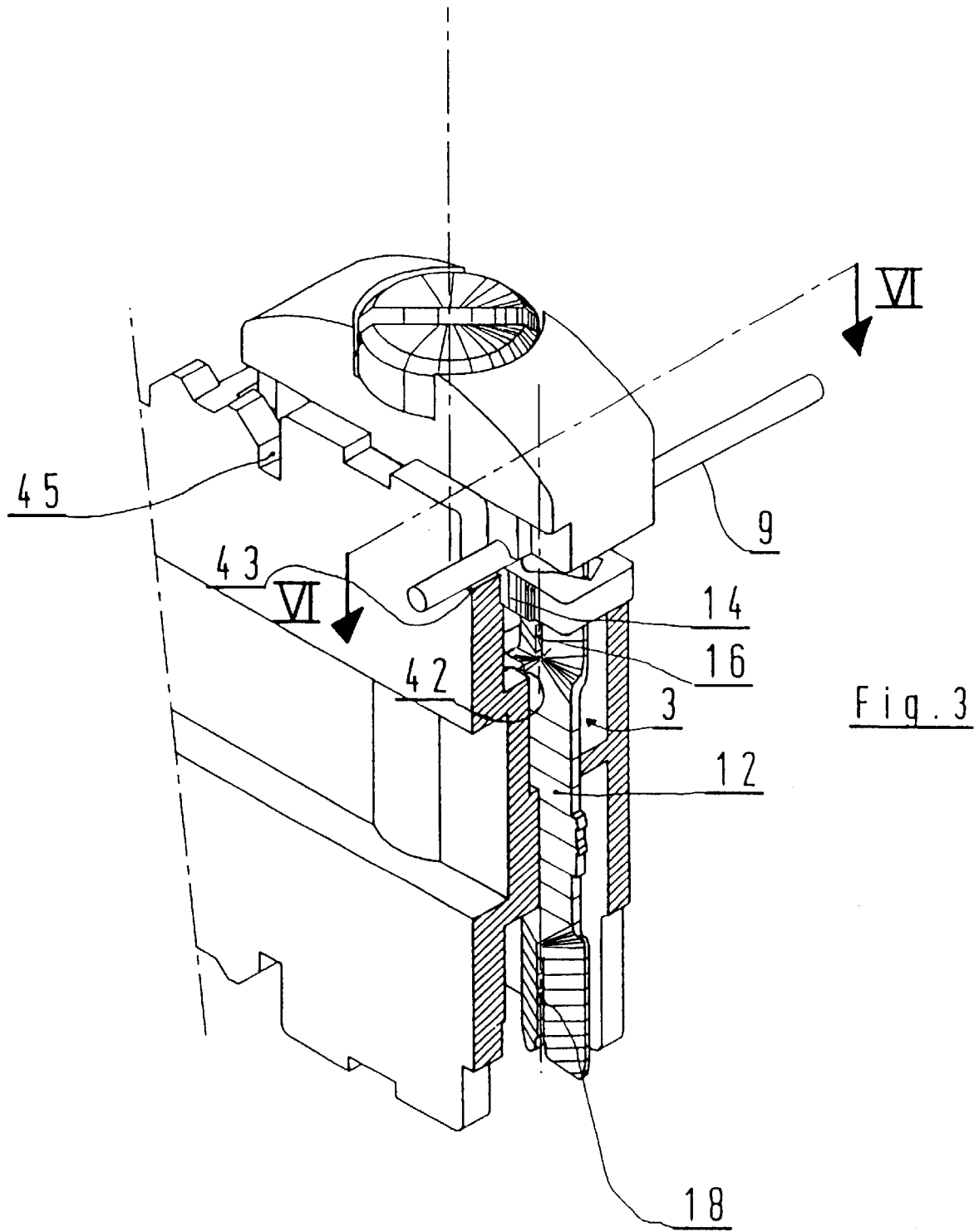

As shown in FIGS. 3 and 6, the wire 9 then begins to be sectioned by the blade 14. In this action of sectioning, the extreme downstream part 44 of the wire 9 is, at least in this embodiment, maintained in abutment on the above-mentioned lower edge 43 of the base 1.

The pusher 4 descends further as the screw 5 is turned, with the result that the wire is totally sectioned by the cutting blade 14 and, substantially at the end of this sectioning operation, is then introduced in the insulation-displacing slot 16 of the I.D.C. contact 12, which starts its operation of connection by insulation-displacement. When this action of connection is positively started, the free end of the wire 9 is then disengaged from the cutting blade 4 and therefore arrives therebelow. 30 According to FIGS. 4, 7, 7A, 8 and 10, the other extreme position is reached, for which the telephone strand or wire 9 (the same obviously applying to the other telephone strand or wire 10) is, on the one hand, totally sectioned, the scrap 44 dropping by gravity outside the terminal block, and, on the other hand, totally connected in the I.D.C. contact 12. In this final position, the electrical wire 9 arrives at a distance "e" beneath this cutting blade 14, and is therefore electrically insulated therefrom.

The reduction ratio due to the use of the screw 5 makes it possible to connect without problem electrical wires. The conducting core of said electrical wires has a diameter which conducting core presents a diameter which is included at minimum between 0.4 and 0.8 mm.

Furthermore, the width of the flattened end of the screw-driver used for turning the screw 5 is not limited, since this flattened end may project without drawback from each side of the head of the screw 5 which projects from the upper surface of the pusher 4.

During these successive operations, consecutive to the progressive descent of the pusher 4, the gel or other like product located in the base 1 is progressively compressed by the pusher 4 which slides down with smooth friction in the cavity 3, this causing it to progressively rise towards the internal hollow part of the pusher 4, until it fills the abovementioned upper chambers 22, 23. In its displacement, it copiously embeds the useful upper parts of the I.D.C. contacts 12 and 13, as well as the sectioned ends 46 (FIG. 7A) of the two wires 9, 10 thus connected.

On this subject, it is recalled that these ends 46 (at the end of which the core of each wire is bared), are then positioned below the associated cutting blade 14 or 15, and are therefore very well protected by the gel or other like product which envelops them, avoiding in particular the phenomena of electrolysis which might be produced if, a contrario, the cutting blade descended low enough for its metallic part still to be in contact with the metallic core of wire 9 or 10, at the end of the operation of connection.

The wires 9 and 10 being thus connected, and protected by the gel or other like sealing product, it is then particularly easy to disconnect and connect them again, as desired, for example for test or corrective maintenance operations.

To that end, from the position of FIG. 8, it suffices to unscrew the master screw 5. The wires 9 and 10, which are imprisoned in their respective receiving slots 31 and 32, are then very progressively drawn upwardly by the respective horizontal lower wall 47, 48 of these slots, with the result that they are smoothly extracted from their respective insulation-displacing slots 16 and 17, and finally disconnected from their I.D.C. contacts 12 and 13 when the screw 5 has arrived in its upper position in FIG. 9. It is then easy to connect these wires again by the reverse operation.

It goes without saying that the invention is not limited to the embodiment which has just been described.

For example, this device might be shaped in order to be able to connect only one wire, or, on the contrary, be shaped in order to be able to connect more than two wires at a time. For example, in order in particular to interconnect two pairs of wires in one and the same descending movement of the screw 5, it may be provided to screw the free end of the latter in another connection pusher (associated with two cutting blades like the first) of the second pair, this pusher being virtually identical to pusher 4, coaxial thereto and placed head-to-tail with respect thereto. On the other hand, it is provided with the coaxial tapping 6 for receiving the screw 5, this tapping 6 in that case not being made in the base 1, contrary to what is seen in FIGS. 8 to 10; in this base, it is simply replaced by a coaxial through orifice for free passage of the screw 5. Consequently, this second connection pusher would rise under the action of this screw, connecting this second pair while cutting its two scraps in similar manner, while the connection pusher 4 would descend and act as described hereinbefore with regard to the first pair.

Likewise, instead of being designed to penetrate, by telescopic smooth friction slide, inside the cavity 3, the pusher 4 might very well be designed so that its internal space has dimensions slightly greater than the outer dimensions of the envelope which defines the cavity 3, so that, by screwing the screw 5, it would then be the base 1 which penetrates, with telescopic smooth friction, inside the pusher 4.

What is claimed is:

1. A device for making an insulation-displacing connection (I.D.C.) of at least one electrical or telephone wire and for cutting scrap from the end of the wire, the device comprising:
   an insulating base having a cavity formed therein;
   at least one I.D.C. contact received in the cavity, the I.D.C. contact having an I.D.C. slot for receiving the wire therein;
   at least one blade for cutting the scrap from the end of the wire, the blade being located opposite and in substantially parallel relation to the I.D.C. contact;
   at least one connection pusher having at least one slot formed therein for receiving the wire, the connection pusher being telescopically received in the insulating base and movable in a predetermined direction over a predetermined distance to completely connect the wire and cut the scrap from the end of the wire, the slot extending laterally with respect to the predetermined direction;
   wherein the cutting blade is dimensioned and positioned relative to the I.D.C. contact to be electrically separated from the wire after it is completely connected; and
   wherein the height of the cutting blade is less than the length of the I.D.C. slot.

2. The device of claim 1, wherein the base comprises
   an upper edge;
   at least one bead formed in the upper edge and positioned opposite the slot in the pusher, the bead having an inwardly oriented slope, the slope cooperating with the opposing surface of the slot to define a narrowed inlet for inhibiting accidental removal of the wire once received in the slot and to define a bevel for directing the wire toward the I.D.C. slot when the pusher is being advanced.

3. The device of claim 1, further comprising a master screw received in the pusher and the base with a screw axis parallel to the axis of the I.D.C. contact, wherein rotation of the master screw progressively displaces the connection pusher relative to the I.D.C. contacts to connect the pair of wires.

4. The device of claim 3, further comprising at least one retaining catch formed on the pusher and a corresponding slot in a vertical wall of the base, the catch moving relative to the slot during displacement of the pusher, the catch sized to engage the ends of the slot when the pusher is in a remote position from the base, whereby the pusher is guided relative to the base and retained captive by the base.

5. The device of claim 1, wherein the base and the pusher are adapted to form a substantially closed reservoir for gel or like means for sealing and protecting against outside elements.

6. The device of claim 5, wherein the pusher has at least one space formed therein beyond the I.D.C contact when the wire is completely connected, the space adapted to receive gel or like means for sealing and protecting against outside elements.

7. The device of claim 6, wherein the pusher includes at least one test orifice above and in communication with the space in the pusher to allow access to the I.D.C. contact.

8. A device for making insulation displacing connections (I.D.C.s) for two wires, the device comprising:
   an insulating base having a cavity formed therein;
   at least two I.D.C. contacts received in the cavity, each I.D.C. contact having an I.D.C. slot for receiving a corresponding one of the wires therein;
   at least two blades for cutting the scrap from the ends of the wires, each blade corresponding to a respective one of the I.D.C. contacts;
   at least one connection pusher having at least two slots formed therein for receiving the wires, the connection pusher being telescopically received in the insulating base and movable in a predetermined direction over a predetermined distance to completely connect the wires and cut the scrap from the ends of the wires, the slots extending laterally with respect to the predetermined direction;

wherein the cutting blades are dimensioned and positioned relative to the I.D.C. contacts to be electrically separated from the wires after the wires are completely connected;

a master screw received in the pusher and the base with a screw axis parallel to the axes of the I.D.C. contacts, the screw being located between the I.D.C. contacts and blades, rotation of the master screw progressively displacing the connection pusher relative to the I.D.C. contacts to connect the pair of wires.

9. The device of claim 8, wherein the pusher extends symmetrically on either side of the screw axis.

10. A device for making an insulation-displacing connection (I.D.C.) of at least one electrical or telephone wire and for cutting scrap from the end of the wire, the device comprising:

an insulating base having a cavity formed therein;

at least one I.D.C. contact received in the cavity, the I.D.C. contact having an I.D.C. slot for receiving the wire therein;

at least one blade for cutting the scrap from the end of the wire, the blade being located opposite and in substantially parallel relation to the I.D.C. contact;

at least one connection pusher having at least one slot formed therein for receiving the wire, the connection pusher being telescopically received in the insulating base and movable in a predetermined direction over a predetermined distance to completely connect the wire and cut the scrap from the end of the wire, the slot extending laterally with respect to the predetermined direction;

wherein the cutting blade is dimensioned and positioned relative to the I.D.C. contact to be electrically separated from the wire after it is completely connected;

wherein the base and the pusher are adapted to form a substantially closed reservoir for gel or like means for sealing and protecting against outside elements, the reservoir comprising an additional cavity for holding the gel or the like means.

11. A device for making an insulation-displacing connection (I.D.C.) of at least one electrical or telephone wire and for cutting scrap from the end of the wire, the device comprising:

an insulating base having a cavity formed therein;

at least one I.D.C. contact received in the cavity, the I.D.C. contact having an I.D.C. slot for receiving the wire therein;

at least one blade for cutting the scrap from the end of the wire, the blade being located opposite and in substantially parallel relation to the I.D.C. contact; and at least one connection pusher having at least one slot formed therein for receiving the wire, the connection pusher being telescopically received in the insulating base and movable in a predetermined direction over a predetermined distance to completely connect the wire and cut the scrap from the end of the wire, the slot extending laterally with respect to the predetermined direction;

wherein the cutting blade is dimensioned and positioned relative to the I.D.C. contact to be electrically separated from the wire after it is completely connected.

12. The device of claim 11 for making a plurality of insulation-displacing connections (I.D.C.s) for a corresponding plurality of electrical or telephone wires and for cutting the scrap from the ends of the wires thus connected, the device further comprising plurality of the I.D.C. contacts and a corresponding plurality of the cutting blades, wherein the connection pusher has at least one portion with lateral slots for receiving the plurality of wires therein; and a master screw received in the pusher and the base with a screw axis parallel to the axes of the I.D.C. contacts, the screw being located between the I.D.C. contacts and blades, rotation of the master screw progressively displacing the connection pusher relative to the I.D.C. contacts to connect the plurality of wires.

* * * * *